US007675259B2

(12) United States Patent
Iesaki

(10) Patent No.: US 7,675,259 B2
(45) Date of Patent: Mar. 9, 2010

(54) CONTROLLER FOR DC MOTOR

(75) Inventor: Kenichi Iesaki, Inazawa (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 401 days.

(21) Appl. No.: 11/622,910

(22) Filed: Jan. 12, 2007

(65) Prior Publication Data

US 2007/0166016 A1 Jul. 19, 2007

(30) Foreign Application Priority Data

Jan. 16, 2006 (JP) ............................ 2006-007870
Jan. 27, 2006 (JP) ............................ 2006-018616

(51) Int. Cl.
*H02P 1/40* (2006.01)

(52) U.S. Cl. ...................... 318/739; 318/560; 347/111; 347/215; 347/221

(58) Field of Classification Search .................... 347/1, 347/5, 167, 111, 133, 179, 186, 211, 252, 347/215, 221; 318/265, 65, 127, 739, 280, 318/568.17, 560, 727
See application file for complete search history.

(56) References Cited

U.S. PATENT DOCUMENTS 4,542,998 A * 9/1985 Osmera et al. .............. 400/139
5,360,279 A * 11/1994 Asai et al. ................ 400/216.1
5,468,078 A * 11/1995 Asai et al. ................... 400/215
5,539,439 A * 7/1996 Ono et al. ..................... 347/76
5,786,842 A * 7/1998 Awai et al. .................. 347/217
6,243,336 B1 * 6/2001 Schell et al. ............. 369/44.29
6,266,306 B1 * 7/2001 Schell et al. ............. 369/44.34
6,563,286 B2 * 5/2003 Seki et al. ................... 318/727
6,719,396 B2 * 4/2004 Anzai .......................... 347/19
6,741,529 B1 * 5/2004 Getreuer .................. 369/30.17
6,809,489 B1 * 10/2004 Yoshida et al. .............. 318/560
6,850,028 B2 * 2/2005 Yoshihisa et al. ........... 318/696
7,415,239 B2 * 8/2008 Saito et al. .................. 399/388
7,448,730 B2 * 11/2008 Hirayama .................... 347/59
2003/0178958 A1 * 9/2003 Akiyama .................... 318/280

FOREIGN PATENT DOCUMENTS

JP 2003-079189 A 3/2003
JP 2003-348878 A 12/2003
JP 2004-250133 A 9/2004

* cited by examiner

*Primary Examiner*—Bentsu Ro
*Assistant Examiner*—Antony M Paul
(74) *Attorney, Agent, or Firm*—Baker Botts L.L.P.

(57) ABSTRACT

A first determining section determines whether a recording medium is conveyed in a first direction. A setting section sets a first current value as a current initially outputted to a DC motor each time the first determining section determines that the recording medium is conveyed in the first direction. A first current outputting section outputs a current at the first current value, and subsequently outputs by steps a current gradually higher than the first current value motor until the first determining section again determines that the recording medium is conveyed in the first direction. A second determining section determines whether the recording medium is conveyed in a second direction opposite the first direction after the first current outputting section outputs a current at the first current value. A first updating section updates the first current value to a second current value higher than the first current value, when the second determining section determines that the recording medium is conveyed in the second direction.

10 Claims, 11 Drawing Sheets

CONTROLLER FOR DC MOTOR

CROSS REFERENCE TO RELATED APPLICATIONS

This application claims priority from Japanese Patent Application Nos. 2006-007870 filed Jan. 16, 2006 and 2006-018616 filed Jan. 27, 2006. The entire content of each of these priority applications is incorporated herein by reference.

TECHNICAL FIELD

The invention relates to a controller for a DC motor and an inkjet recording device.

BACKGROUND

An inkjet recording device well known in the art has a conveying device for conveying a recording medium, and a recording head for ejecting ink onto the recording medium to record an image thereon. In recent years, DC motors have been used in place of the more expensive pulse motors for driving the conveying device in the inkjet recording device. The inkjet recording device controls conveyance of the recording medium by controlling the driving of the DC motor.

A conventional method of controlling conveyance of the recording medium involves providing an optical sensor capable of detecting the rotation of the DC motor and tracking the rotation of the DC motor by counting pulse signals outputted from the optical sensor each time the DC motor rotates. References to this method have been disclosed in Japanese Patent Application Publication Nos. 2003-79189 and 2004-250133.

SUMMARY

It has been found that, when conveying a recording medium in a conveying direction, a force acts on the recording medium to return the medium in the direction opposite the conveying direction (referred to as "back tension") due to the effects of tension in the recording medium, cogging torque in the DC motor, and the like. Therefore, after each time the recording medium is conveyed in the conveying direction, the current supplied to the DC motor is set to an initial holding current value $I_{f0}$ rather than 0 to prevent back tension from returning the recording medium in the direction opposite the conveying direction.

However, the magnitude of back tension is affected by the type of recording medium and characteristics of the DC motor. Hence, if the back tension is greater than the force produced by the initial holding current value $I_{f0}$, the back tension will repeatedly act on the recording medium to return the medium in the direction opposite the conveying direction the instant the initial holding current value $I_{f0}$ is supplied to the DC motor, resulting in an inability to convey the recording medium to a reference position $P_{ref}$.

On the other hand, if the back tension is smaller than the force produced by the initial holding current value $I_{f0}$, the DC motor will convey the recording medium farther in the conveying direction when the initial holding current value $I_{f0}$ is supplied to the DC motor, resulting in the recording medium being conveyed past the reference position, i.e., overshooting the reference position.

Japanese Patent Application Publication No. 2003-348878 discloses a method of conveying the recording medium in smaller increments. According to this method, a current incrementing amount $A_f$ of the current supplied to the DC motor is reduced by steps as the recording medium approaches the reference position, thereby rapidly conveying the recording medium to the reference position without overshooting the position.

However, the techniques described above are still unable to convey the recording medium to the reference position quickly.

In view of the foregoing, it is an object of the invention to provide a controller for a DC motor and an inkjet recording device capable of conveying a recording medium to a reference position with great precision while not being influenced by the type of recording medium or the characteristics of the DC motor.

It is another object of the invention to provide a controller for a DC motor and an inkjet recording device capable of conveying a recording medium to the reference position rapidly and accurately.

In order to attain the above and other objects, according to one aspect, the invention provides a controller for a DC motor. The controller for a DC motor includes a first determining section, a setting section, a first current outputting section, a second determining section, and a first updating section. The first determining section determines whether a recording medium is conveyed in a first direction, based on a signal outputted from a detector that detects rotation of a DC motor. The first direction is a direction toward a reference position. The setting section sets a first current value as a current initially outputted to the DC motor each time the first determining section determines that the recording medium is conveyed in the first direction. The first current outputting section outputs to the DC motor a current at the first current value set by the setting section, and subsequently outputs by steps a current gradually higher than the first current value to the DC motor until the first determining section again determines that the recording medium is conveyed in the first direction. The second determining section determines whether the recording medium is conveyed in a second direction opposite the first direction after the first current outputting section outputs a current at the first current value to the DC motor. The first updating section updates the first current value set by the setting section to a second current value higher than the first current value, when the second determining section determines that the recording medium is conveyed in the second direction.

According to another aspect, the invention provides a controller for a DC motor. The controller for a DC motor includes a first determining section, a setting section, a first current outputting section, a third determining section, a second updating section, and a second current outputting section. The first determining section determines whether a recording medium is conveyed in a first direction, based on a signal outputted from a detector that detects rotation of a DC motor. The first direction is a direction toward a reference position. The setting section sets a first current value as a current initially outputted to the DC motor each time the first determining section determines that the recording medium is conveyed in the first direction. The first current outputting section outputs to the DC motor a current at the first current value set by the setting section, and subsequently outputs by steps a current gradually higher than the first current value to the DC motor until the first determining section again determines that the recording medium is conveyed in the first direction. The third determining section determines whether the recording medium is conveyed beyond the reference position after the first current outputting section outputs a current at the first current value to the DC motor. The second updating section updates the first current value set by the setting section to a third current value lower than first current value, when the third determining section determines that the recording medium is conveyed beyond the reference position. The second current outputting section outputs in steps, to the DC motor, a current at a current value gradually lower than the first current value toward the third current value updated by the second updating section.

According to another aspect, the invention provides a controller for a DC motor. The controller for a DC motor includes a first determining section, a current outputting section, a second determining section, a first setting section, and a second setting section. The first determining section determines whether a recording medium is conveyed in a conveying direction from a predetermined position toward a reference position, based on a signal outputted from a detector that detects rotation of a DC motor. The current outputting section outputs to the DC motor a current that is incremented by steps from a predetermined current value during a time period after the first determining section determines that the recording medium is conveyed in the conveying direction and until the first determining section again determines that the recording medium is conveyed in the conveying direction. The second determining section determines, based on a signal outputted from the detector, whether the recording medium is conveyed to an intermediate position that is between the predetermined position and the reference position. The first setting section sets a first incrementing amount such that the first incrementing amount decreases as the recording medium approaches the reference position when the second determining section determines that the recording medium has not reached the intermediate position. The first incrementing amount is an amount for incrementing a current to be outputted by the current outputting section when the recording medium is positioned between the predetermined position and the intermediate position. The second setting section sets a second incrementing amount to a value greater than an imaginary incrementing amount when the second determining section determines that the recording medium has reached the intermediate position. The second incrementing amount is an amount for incrementing a current to be outputted by the current outputting section when the recording medium is positioned between the intermediate position and the reference position. The imaginary incrementing amount is an amount that is finally set by the first setting section assuming that the first setting section continually reduces the first incrementing amount when the recording medium is positioned between the intermediate position and the reference position.

According to another aspect, the invention provides an inkjet recording device. The inkjet recording device includes a DC motor, a detector, a conveying device, a recording head, and a controller that controls the DC motor. The detector detects rotation of the DC motor. The conveying device is driven by the DC motor for conveying a recording medium. The recording head ejects ink on the recording medium conveyed by the conveying device. The controller includes a first determining section, a setting section, a first current outputting section, a second determining section, and a first updating section. The first determining section determines whether the recording medium is conveyed in a first direction based on a signal outputted from the detector. The first direction is a direction toward a reference position. The setting section sets a first current value as a current initially outputted to the DC motor each time the first determining section determines that the recording medium is conveyed in the first direction. The first current outputting section outputs to the DC motor a current at the first current value set by the setting section, and subsequently outputs by steps a current gradually higher than the first current value to the DC motor until the first determining section again determines that the recording medium is conveyed in the first direction. The second determining section determines whether the recording medium is conveyed in a second direction opposite the first direction after the first current outputting section outputs a current at the first current value to the DC motor. The first updating section updates the first current value set by the setting section to a second current value higher than the first current value, when the second determining section determines that the recording medium is conveyed in the second direction.

According to another aspect, the invention provides an inkjet recording device. The inkjet recording device includes a DC motor, a detector, a conveying device, a recording head, and a controller that controls the DC motor. The detector detects rotation of the DC motor. The conveying device is driven by the DC motor for conveying a recording medium. The recording head ejects ink on the recording medium conveyed by the conveying device. The controller includes a first determining section, a current outputting section, a second determining section, a first setting section, and a second setting section. The first determining section determines whether the recording medium is conveyed in a conveying direction from a predetermined position toward a reference position based on a signal outputted from the detector. The current outputting section outputs to the DC motor a current that is incremented by steps from a predetermined current value during a time period after the first determining section determines that the recording medium is conveyed in the conveying direction and until the first determining section again determines that the recording medium is conveyed in the conveying direction. The second determining section determines, based on a signal outputted from the detector, whether the recording medium is conveyed to an intermediate position that is between the predetermined position and the reference position. The first setting section sets a first incrementing amount such that the first incrementing amount decreases as the recording medium approaches the reference position when the second determining section determines that the recording medium has not reached the intermediate position. The first incrementing amount is an amount for incrementing a current to be outputted by the current outputting section when the recording medium is positioned between the predetermined position and the intermediate position. The second setting section sets a second incrementing amount to a value greater than an imaginary incrementing amount when the second determining section determines that the recording medium has reached the intermediate position. The second incrementing amount is an amount for incrementing a current to be outputted by the current outputting section when the recording medium is positioned between the intermediate position and the reference position. The imaginary incrementing amount is an amount that is finally set by the first setting section assuming that the first setting section continually reduces the first incrementing amount when the recording medium is positioned between the intermediate position and the reference position.

BRIEF DESCRIPTION OF THE DRAWINGS

Illustrative aspects in accordance with the invention will be described in detail with reference to the following figures wherein.

DETAILED DESCRIPTION

Figure 1:
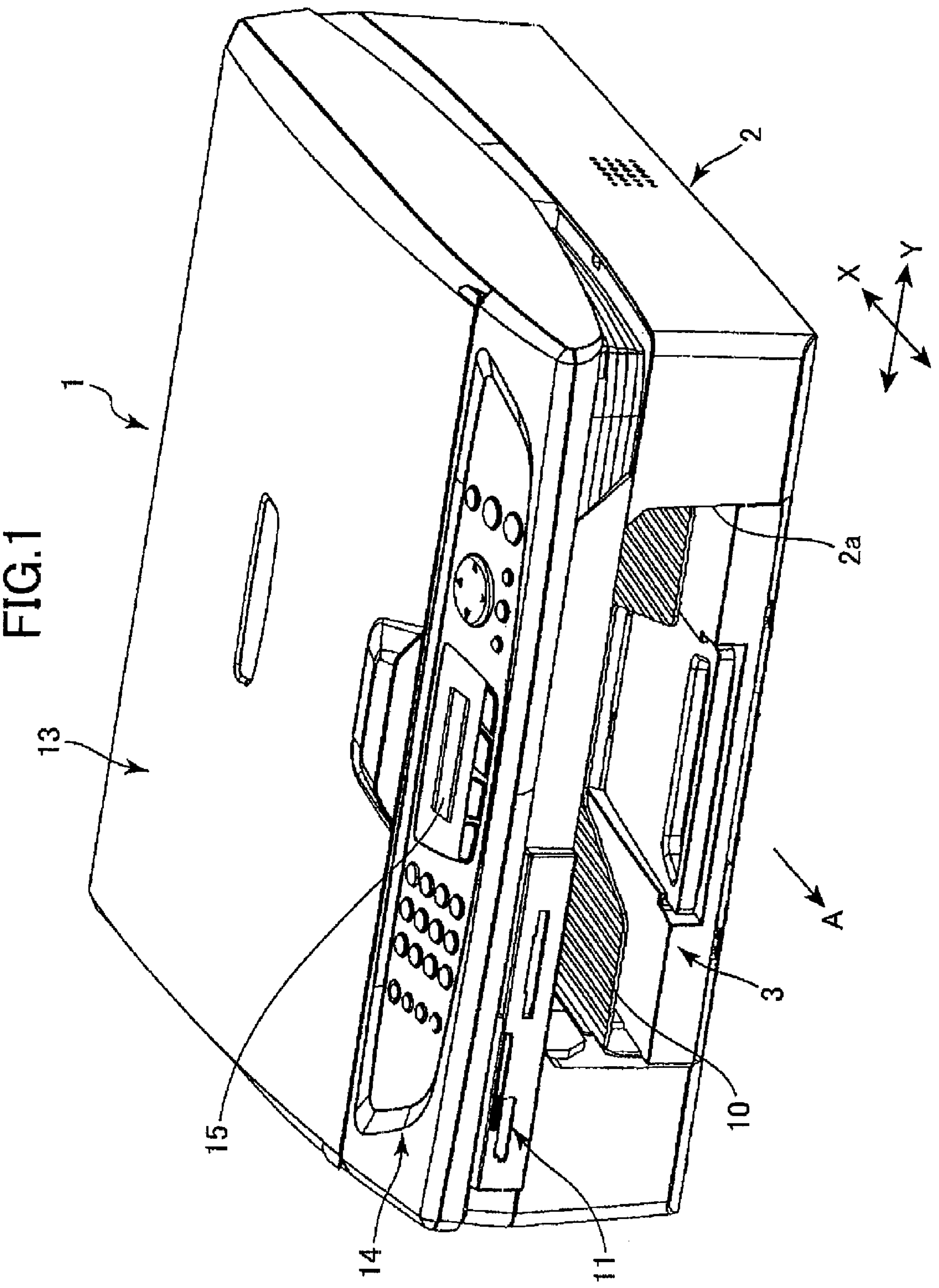
FIG. 1 is a perspective view of a multifunction peripheral according to embodiments of the invention.

A controller for a DC motor and an inkjet recording device according to some aspects of the invention will be described while referring to the accompanying drawings wherein like parts and components are designated by the same reference numerals to avoid duplicating description.

In the following description, the expressions “front”, “rear”, “upper”, “lower”, “right”, and “left.” are used to define the various parts when the inkjet recording device is disposed in an orientation in which it is intended to be used.

Figure 2:
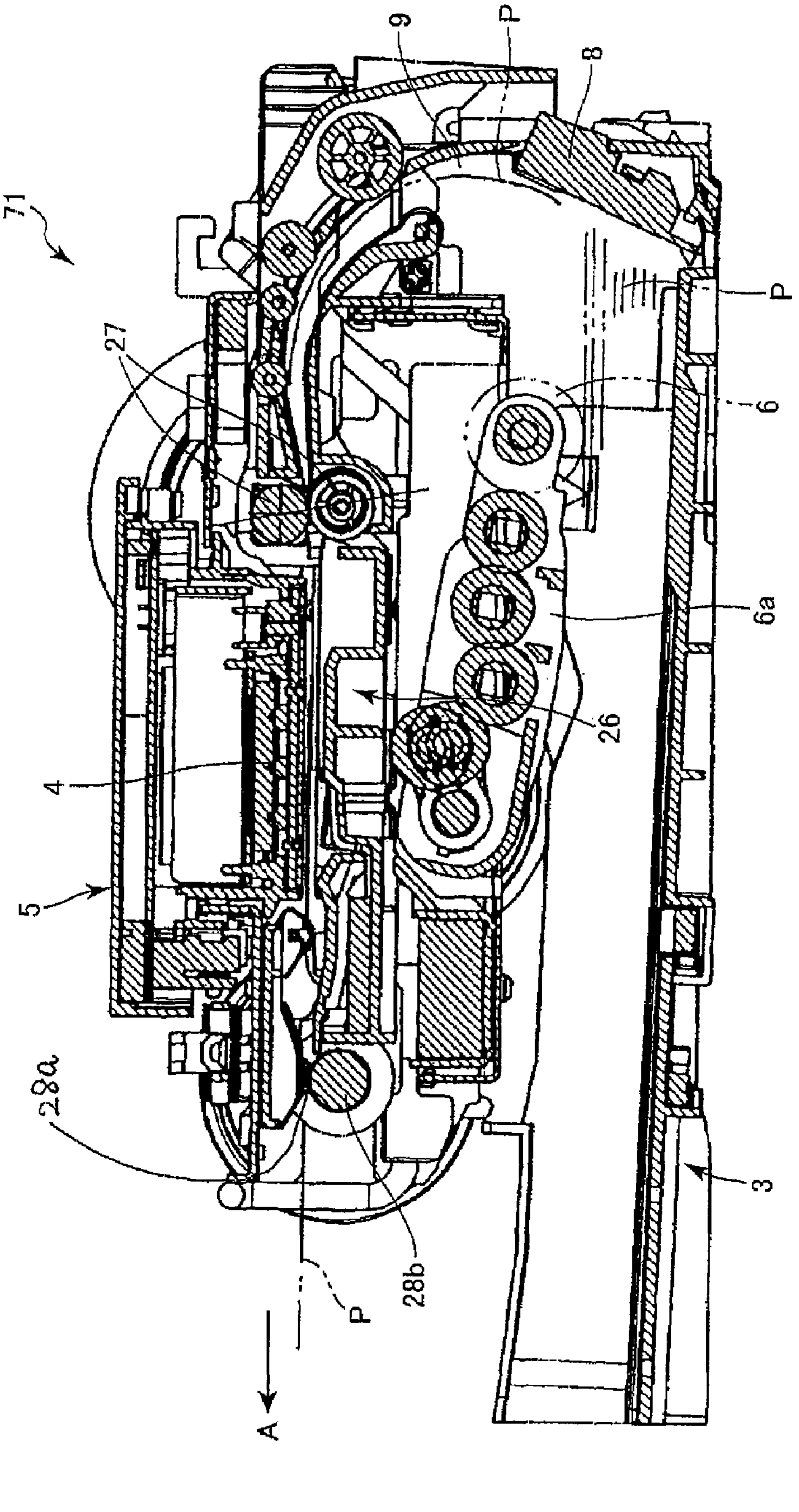
FIG. 2 is a cross-sectional view of a printing unit in the multifunction peripheral.

A controller for a DC motor according to a first embodiment of the invention will be described with reference to FIGS. 1 through 6. FIG. 1 is a perspective view showing the front of a multifunction peripheral 1. FIG. 2 is a cross-sectional view showing a printer component provided in the multifunction peripheral 1. The multifunction peripheral 1 shown in FIG. 1 is provided with a printer function, copier function, scanner function, and facsimile function. However, the invention may be applied to an inkjet printer having only a printer function.

As shown in FIG. 1, the multifunction peripheral 1 has a housing 2 with an opening 2*a* formed in the front side (the near side in FIG. 1) thereof. The interior of the opening 2*a* is partitioned vertically into a lower section and an upper section. A paper cassette 3 that can be inset into the opening 2*a* is provided in the lower section thereof for holding a recording medium (a recording paper P) to be fed into the multifunction peripheral 1. The upper section of the opening 2*a* forms a discharge section 10 in which the printed recording paper P is discharged. The printed paper P is discharged in the direction of the arrow A.

The paper cassette 3 accommodates a plurality of cut sheets of the paper P in a stacked state with the short edges of the paper P aligned with the main scanning direction (Y direction) orthogonal to the paper-conveying direction (X direction). The paper P may be sheets cut to the A4 size, letter size, or postcard size, for example.

An image reader is provided in the upper section of the housing 2 for reading an original document or the like when implementing the copier function or facsimile function. The image reader can be pivotally moved open or closed on one side of the housing 2 about a shaft part (not shown) provided on the other side. An original cover 13 is provided for covering the top surface of the image reader and is also capable of pivotally moving open and closed over the image reader about a shaft provided on the rear edge of the same. Beneath the original cover 13, the image reader is configured of a glass plate for supporting an original, and a scanner 70 (see FIG. 3) configured of a contact image sensor (CIS), for example, disposed beneath the glass plate and capable of reciprocating in the main scanning direction (Y direction). With this construction, the user lifts up the original cover 13 and places an original document on the glass plate, and the scanner 70 scans an image from the document.

Disposed on top of the housing 2 are a control panel 14 positioned to the front of the original cover 13 and provided with various operating buttons, and a liquid crystal display (LCD) 15 for displaying operating procedures and the status of a process being executed. An external memory insertion section 11 is provided on the front surface of the housing 2 below the control panel 14 for accepting the insertion of external memory. Examples of external memory that may be accepted in the external memory insertion section 11 are CompactFlash (registered trademark), SmartMedia (registered trademark), Memory Stick (registered trademark), SD Cards (registered trademark), and xD-Picture Cards (registered trademark), for example.

As shown in FIG. 2, a printing unit 71 is accommodated on the multifunction peripheral 1 and functions to record images on the paper P. A sloped part 8 is provided on the rear end of the paper cassette 3 (right side in FIG. 2) beneath the printing unit 71 for separating sheets fed into the printing unit 71. An arm 6*a* is mounted farther toward the front surface of the housing 2 than the sloped part 8 (upstream of the sloped part 8 with respect to a direction for feeding the paper P) such that a distal end is capable of swingably moving vertically. A feeding roller 6 is provided on the distal end of the arm 6*a* for contacting the topmost sheet of the paper P accommodated in the paper cassette 3.

When the feeding roller 6 is driven to rotate in a paper-feeding direction (counterclockwise in FIG. 2), the feeding roller 6 feeds the paper P stacked in the paper cassette 3 against the sloped part 8, which separates the paper P so that only one sheet at a time is conveyed therefrom. The separated sheets of paper P are fed along a U-shaped path 9 to a pair of registration rollers 27 disposed well above the rear end of the paper cassette 3.

The printing unit 71 also includes an inkjet recording head 4 for recording images on the paper P; a carriage 5 for supporting the inkjet recording head 4 and capable of reciprocating in the main scanning direction; a guide member (not shown) disposed on the downstream side of the carriage 5 in the paper-conveying direction (direction indicated by the arrow A) for guiding the reciprocating carriage 5; a timing belt (not shown) arranged parallel to the guide member; a carriage motor 25 (see FIG. 3) for driving the timing belt to reciprocate the carriage 5; a substantially plate-shaped platen 26 for supporting the paper P conveyed along the bottom surface of the inkjet recording head 4; and an encoder strip (not shown) extending in the main scanning direction (Y direction) for detecting the position of the carriage 5 in the Y direction. While the carriage motor 25 is a DC motor in the present embodiment, a stepping motor or the like may also be used.

The encoder strip is disposed with its sensing surface oriented vertically, where the sensing surface has slits formed at regular intervals in the Y direction. A point of origin (home position) for the carriage 5 exists at a predetermined position outside one end of the encoder strip in the Y direction. A carriage home position sensor 73 (see FIG. 3) is disposed at this home position for detecting the carriage 5.

The pair of registration rollers 27 is provided in the printing unit 71 for conveying the paper P fed by the feeding roller 6 along the bottom surface of the inkjet recording head 4. When rotating in a paper-conveying direction (i.e., with the upper roller rotating clockwise and the lower roller rotating counterclockwise in FIG. 2), the registration rollers 27 convey the paper P over the platen 26 and, hence, along the bottom surface of the inkjet recording head 4 disposed downstream of the registration rollers 27 in the conveying direction. Of the pair of registration rollers 27, the upper roller is a drive roller driven to rotate by a conveying motor 79 (see FIG. 3), and the lower roller is a follow roller that rotates along with the rotation of the upper roller.

A paper sensor 72 (see FIG. 3) is positioned near the registration rollers 27 above and on the upstream side in the conveying direction for detecting the paper P conveyed by the feeding roller 6. The paper sensor 72 is configured of a common reflective type photosensor having a light-emitting diode and a phototransistor. If the paper sensor 72 does not detect the paper P conveyed by the feeding roller 6, the system driving the feeding roller 6, registration rollers 27, and the like is halted and an error is displayed.

Downstream of the platen 26, the multifunction peripheral 1 is also provided with a spur roller 28*a* contacting the top surface of the paper P, and a discharge roller 28*b* driven by conveying motor 79 and disposed on the bottom surface side of the spur roller 28*a*. The spur roller 28*a* is a follow roller that rotates along with the rotation of the discharge roller 28*b*. Both the spur roller 28*a* and discharge roller 28*b* are capable of rotating in forward and reverse directions (the paper-conveying direction and the direction opposite the paper-conveying direction. In the present embodiment, the paper P is conveyed in steps by driving the registration rollers 27, spur roller 28*a*, and discharge roller 28*b* intermittently in the paper-conveying direction.

While not shown in the drawings, the printing unit 71 is also provided with ink cartridges accommodating ink in four colors (black (BK), cyan (C), magenta (M), and yellow (Y)) for recording full-color images; a flushing unit for flushing ink periodically during a recording operation in order to prevent blockage in the nozzles; and a maintenance unit for performing a recovery process and the like to clean the nozzle surface of the inkjet recording head 4 and remove air bubbles in a buffer tank (not shown) provided on the inkjet recording head 4.

Figure 3:
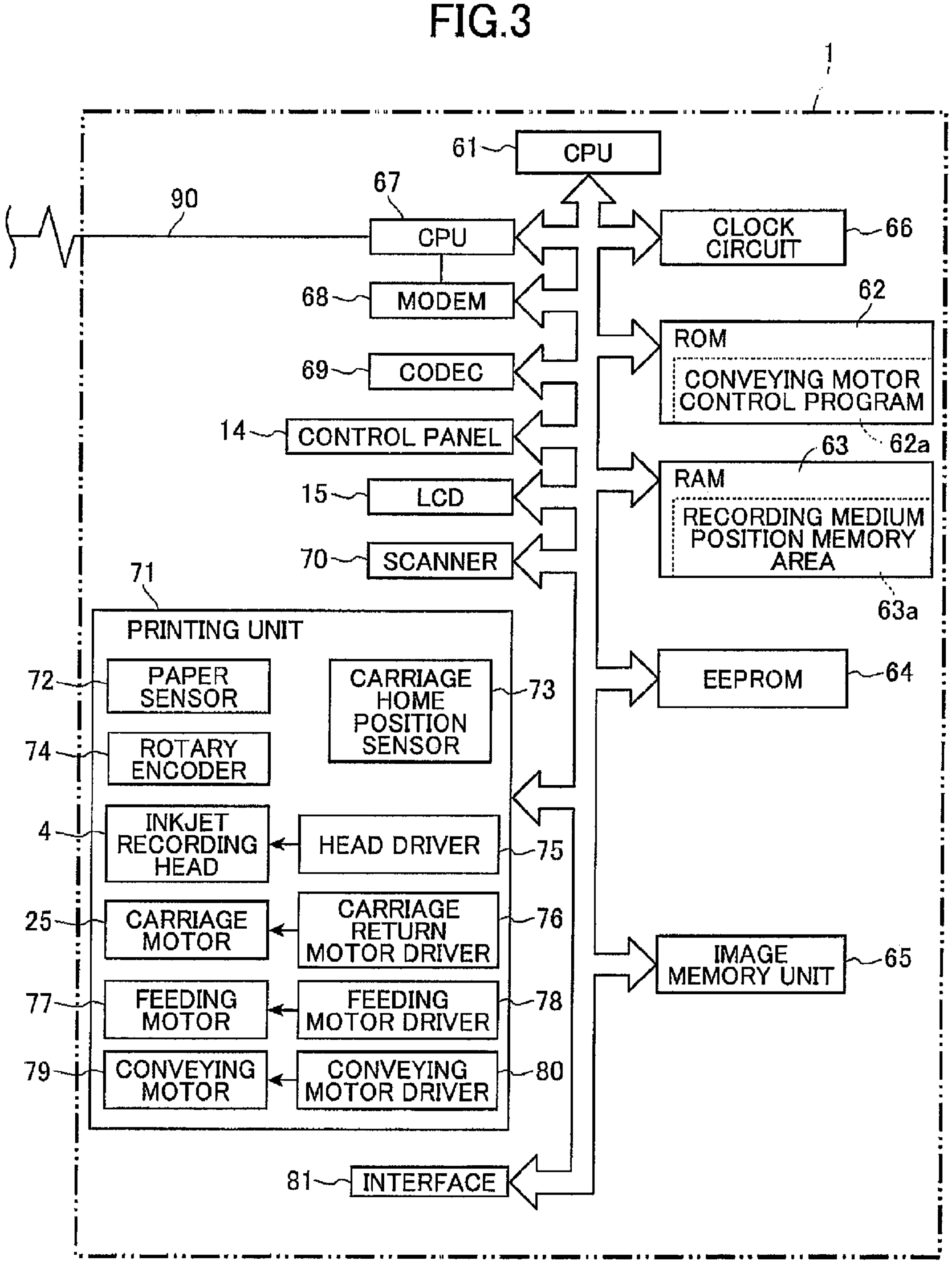
FIG. 3 is a block diagram showing the electrical structure of the multifunction peripheral.

Next, the electrical structure of the multifunction peripheral 1 will be described with reference to the block diagram in FIG. 3. FIG. 3 is a block diagram showing the electrical structure of the multifunction peripheral 1. The multifunction peripheral 1 includes a CPU 61, a ROM 62, a RAM 63, a EEPROM 64, an image memory unit 65, a clock circuit 66, a network control unit (hereinafter "NCU") 67, a modem 68, a CODEC 69, the scanner 70, the printing unit 71, an interface 81, the control panel 14, and the LCD 15, all of which are connected via a bus line and the like. The multifunction peripheral 1 also includes various devices required for implementing the printer function, copier function, scanner function, and facsimile function, such as an audio LSI, buffers, amps, and the like.

The NCU 67 functions to control a network circuit and connects the multifunction peripheral 1 to a common telephone line 90. The NCU 67 receives various signals, such as a calling signal transmitted from an exchanger on the telephone network and a signal indicating the telephone number (caller's number) of the calling device (caller), transmits a dialing signal to the exchanger when placing a call based on button operations performed on the control panel 14 receives various signals, such as a calling signal transmitted from an exchanger on the telephone network and a signal indicating the telephone number (caller's number) of the calling device (caller), transmits a dialing signal to the exchanger when placing a call based on button operations performed on the control panel 14, and transmits and receives analog voice signals during a call. The NCU 67 receives calls automatically from the telephone line 90 during data reception and issues calls to another party automatically during data transmission. The CPU 61 supplies digital data representing the number of another party to the NCU 67.

The CPU 61 controls the various components connected via the bus line and the like according to signals exchanged over the NCU 67 in order to implement data communications for a facsimile operation or a telephone call. The CPU 61 also executes a printing operation to print (record) on the paper P facsimile data transmitted over the telephone line 90 (including image data), or print data inputted from a personal computer or external memory device connected via the interface 81.

The CPU 61 executes control processes according to control programs stored in the ROM 62 for controlling the ejection of ink droplets, detecting the existence and amount of ink remaining in the cartridges, and the like. The CPU 61 generates an ejection timing signal and reset signal and transfers the signals to a gate array (not shown). The CPU 61 is connected to various devices in the multifunction peripheral 1 for controlling the operations performed by these devices.

The ROM 62 is a non-rewritable memory that stores control programs executed by the CPU 61, fixed values, and the like. The ROM 62 stores a conveying motor control program 62*a* for implementing a process to control a conveying motor described later. The RAM 63 is a volatile memory for temporarily storing various data generated by the CPU 61 when executing the programs stored in the ROM 62. The RAM 63 includes a recording medium position memory area 63*a* for storing the conveying position of a recording medium by counting pulse signals outputted from a rotary encoder 74 described later.

The EEPROM 64 is a rewritable non-volatile memory. Data stored in the EEPROM 64 is preserved even after the power to the multifunction peripheral 1 is turned off. The clock circuit 66 includes a clock of a predetermined frequency, a frequency dividing circuit, and a counter for keeping track of time. The CPU 61 reads the time counted by the clock circuit 66 (the count value of the counter) for use in various processes. The counter value is updated on the trailing edge of each pulse outputted from the frequency dividing circuit, for example.

The modem 68 is a modulating/demodulating device connected to the NCU 67 that functions to convert analog data transmitted through the telephone line 90 (such as data including encoded image data) to digital data and to convert digital data outputted from the multifunction peripheral 1 to the telephone line 90 (such as data including encoded image data) to analog data. Hence, the modem 68 has both modulating and demodulating mechanisms. The modem 68 also has a sound reproducing mechanism for reproducing sound from analog voice data. The modem 68 also functions to transmit and receive various procedure signals for controlling transmissions. The modem 68 is provided with a transmission buffer and a reception buffer that are used to temporarily store data exchanged with the device of another party.

The CODEC 69 encodes image data read by the scanner 70 and decodes encoded image data received through the telephone line 90. The printing unit 71 records the decoded image data on the paper P.

The image memory unit 65 is configured of dynamic RAM (DRAM), which is an inexpensive, high-capacity memory, for storing bit images (bit data) to be recorded. Image data decoded by the CODEC 69 is temporarily stored in the image memory unit 65. After the printing unit 71 records this image data on the paper P, the data is erased from the image memory unit 65. The image memory unit 65 also stores image data read by the scanner 70. After the image data read by the scanner 70 is encoded by the CODEC 69 and outputted to the telephone line 90, the image data is erased from the image memory unit 65.

The printing unit 71 functions to record (print) data on the paper P supplied in the multifunction peripheral 1. The printing unit 71 includes the paper sensor 72, the carriage home position sensor 73, the rotary encoder 74, the inkjet recording head 4, a head driver 75 for driving the inkjet recording head 4, the carriage motor 25, a carriage return motor driver 76 for controlling the driving of the carriage motor 25, a feeding motor 77 for driving the feeding roller 6, a feeding motor driver 78 for controlling the driving of the feeding motor 77, and a conveying motor driver 80 for controlling the driving of the conveying motor 79.

The rotary encoder 74 is a photosensor capable of detecting rotation of the conveying motor 79. In the present embodiment, the rotary encoder 74 is capable of detecting rotation in the upper roller of the registration rollers 27. Specifically, the conveying motor 79 drives the upper roller of the registration rollers 27 to rotate. The rotary encoder 74 outputs a pulse signal each time the upper roller rotates a predetermined amount. Since the rotational amount of the conveying motor 79 can be known based on the pulse signal, it is possible to control conveyance of the recording medium.

The head driver 75 is a drive circuit that applies a drive pulse having a waveform conforming to a signal outputted from the gate array (not shown) to drive elements corresponding to each nozzle. Drive elements activated by this drive pulse cause ink droplets to be ejected from the corresponding nozzles.

The carriage return motor driver 76, feeding motor driver 78, and conveying motor driver 80 are connected to the carriage motor 25, feeding motor 77, and conveying motor 79, respectively, and are configured of circuits that output an electric current to the respective motors.

The interface 81 employs an electrical contact standard for connecting different devices. The multifunction peripheral 1 is connected via the interface 81 to another device, such as a personal computer or a local area network (LAN), and can exchange data with (or can receive print data from) the personal computer or LAN. The received print data is converted to image data (a bit image) and is written to the image memory unit 65. The external memory insertion section 11 is a connector connected to the CPU 61 via a bus line.

Next, a control operation for conveying a recording medium in fine increments will be described with reference to FIG. 4. The upper graph in FIG. 4 shows the position P of the recording medium at time n, while the lower graph shows a current value I of the electric current outputted to the conveying motor 79 at time n.

Figure 4:
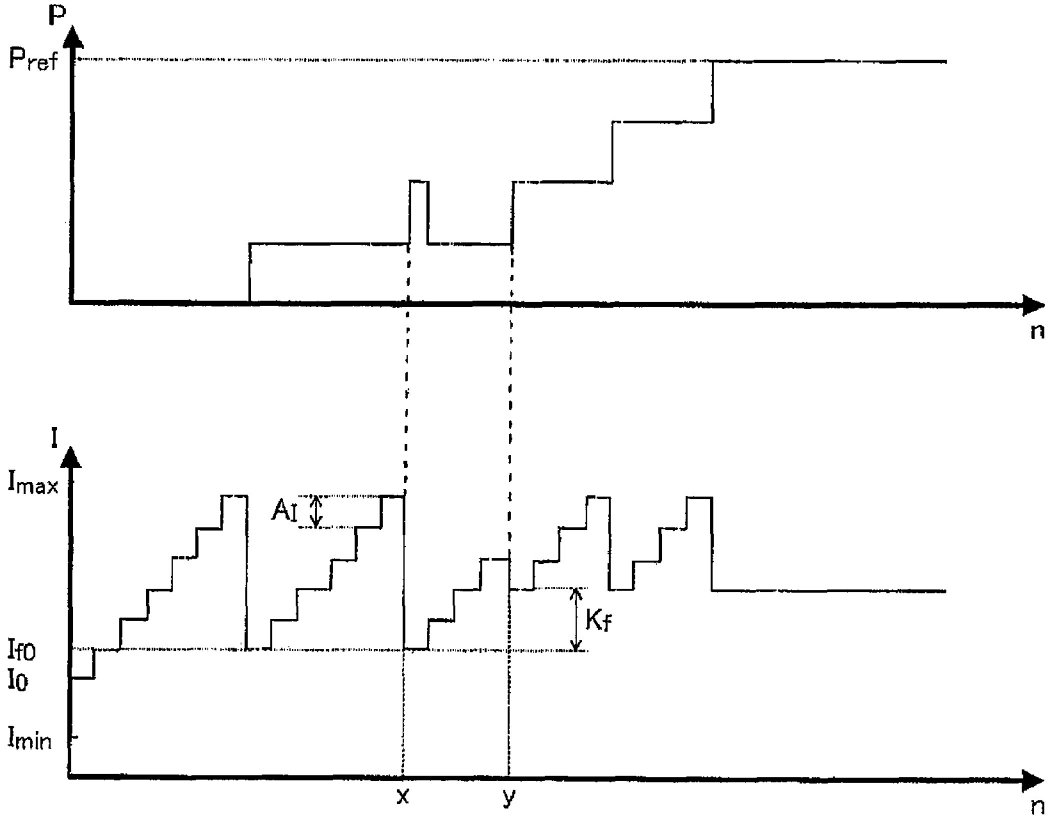
FIG. 4 is an explanatory diagram including an upper graph showing a position P of a recording medium at time n according to a first embodiment, and a lower graph showing a current value I outputted to a conveying motor at time n.

As shown in FIG. 4, when the recording medium is conveyed in small increments, an electric current having an initial current value $I_0$ is first outputted to the conveying motor 79. The initial current value $I_0$ is set to a value that enables the conveying motor 79 to easily start conveying the recording medium against the static frictional force. The current outputted to the conveying motor 79 is subsequently increased from the initial current value $I_0$ by a fixed current incrementing amount $A_I$ at predetermined sampling intervals.

Hence, as the recording medium is conveyed in the conveying direction which is the direction toward the reference position $P_{ref}$, the conveying motor 79 rotates and a single pulse signal is outputted from the photosensor. When this pulse signal is outputted, the current outputted to the conveying motor 79 is increased from an initial holding current value $I_{f0}$ by the fixed current incrementing amount $A_I$.

Basically, the recording medium is conveyed to the reference position $P_{ref}$ by repeatedly performing the step of increasing the current outputted to the conveying motor 79 from the initial holding current value $I_{f0}$ by the fixed current incrementing amount $A_I$ each time the recording medium is conveyed in the conveying direction.

However, back tension also acts on the recording medium. If this back tension is greater than the force produced by the electric current at the initial holding current value $I_{f0}$, the recording medium is conveyed in the direction opposite the conveying direction. As illustrated in FIG. 4, immediately after a current at the initial holding current value $I_{f0}$ is outputted to the conveying motor 79 at the sampling time x, the recording medium is conveyed in the direction opposite the conveying direction.

When this situation occurs, first the current outputted to the conveying motor 79 is increased from the initial holding current value $I_{f0}$ by the fixed current incrementing amount $A_I$, resulting in the recording medium being conveyed again in the conveying direction at the sampling time y. Subsequently, the initial current outputted to the conveying motor 79 is updated from the initial holding current value $I_{f0}$ to a current value obtained by adding a holding current value correction amount $K_f$ to the initial holding current value $I_{f0}$. An electric current at this updated current value is outputted to the conveying motor 79. Each time the recording medium is conveyed in the conveying direction thereafter, a process is executed to increment the electric current outputted to the conveying motor 79 by the fixed current incrementing amount $A_I$ in steps until the recording medium is conveyed to the reference position $P_{ref}$. By controlling the conveyance of the recording medium in this way, the recording medium can be conveyed with accuracy to the reference position by updating the initial holding current value $I_{f0}$, even when the back tension is greater than the force generated by the current at the initial holding current value $I_{f0}$.

Next, the control method for conveying the recording medium in fine increments, as described above, will be described with reference to FIG. 5 for a case in which, unlike the example given above, the back tension is less than the force generated by the current at the initial holding current value $I_{f0}$.

Figure 5:
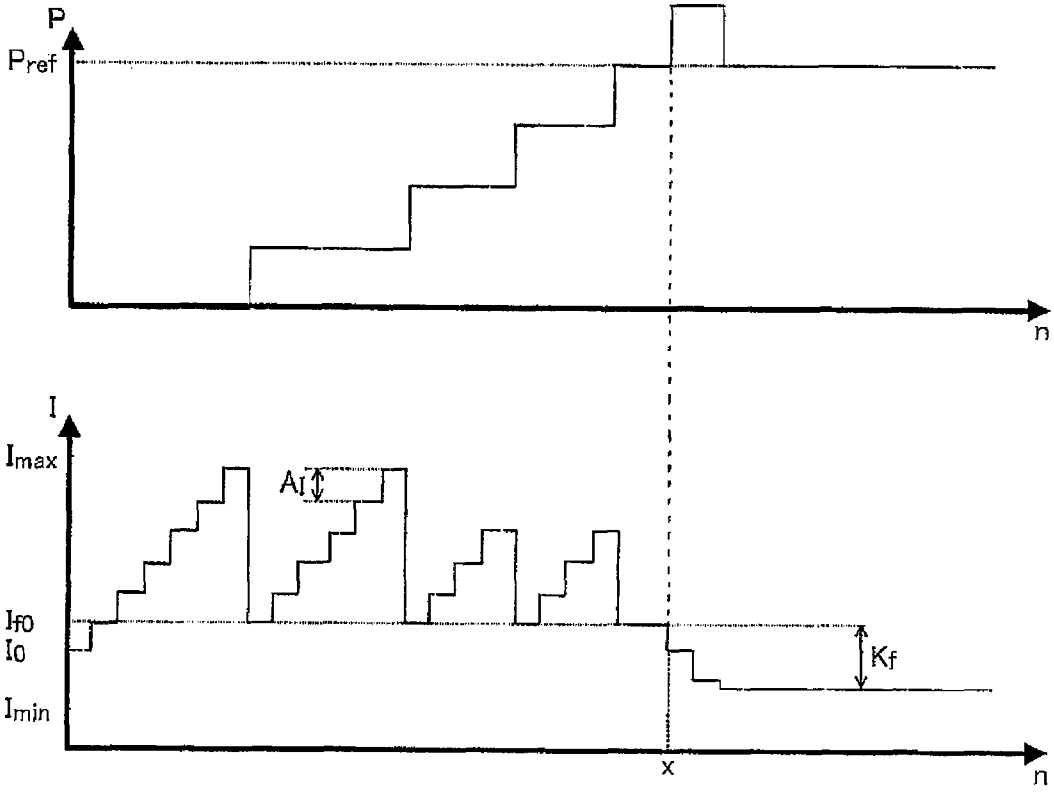
FIG. 5 is an explanatory diagram including an upper graph showing a position P of a recording medium at time n according to the first embodiment, and a lower graph showing a current value I outputted to a conveying motor at time n.

FIG. 5 shows a different example from FIG. 4, but in a similar format. The upper graph in FIG. 5 shows the position P of the recording medium at time n, while the lower graph shows a current value I of the electric current outputted to the conveying motor 79 at time n.

If the back tension is less than the force produced by the current at the initial holding current value $I_{f0}$, unlike the procedure described above, the current at the initial holding current value $I_{f0}$ is outputted to the conveying motor 79 to convey the recording medium in the conveying direction. As shown in FIG. 5, the recording medium may be conveyed too far at the sampling time x, overshooting the reference position $P_{ref}$.

If this situation occurs, the electric current may be outputted in steps from the initial holding current value $I_{f0}$ to a current value less than the initial holding current value $I_{f0}$, thereby conveying the recording medium to the reference position after initially overshooting this position.

Figure 6:
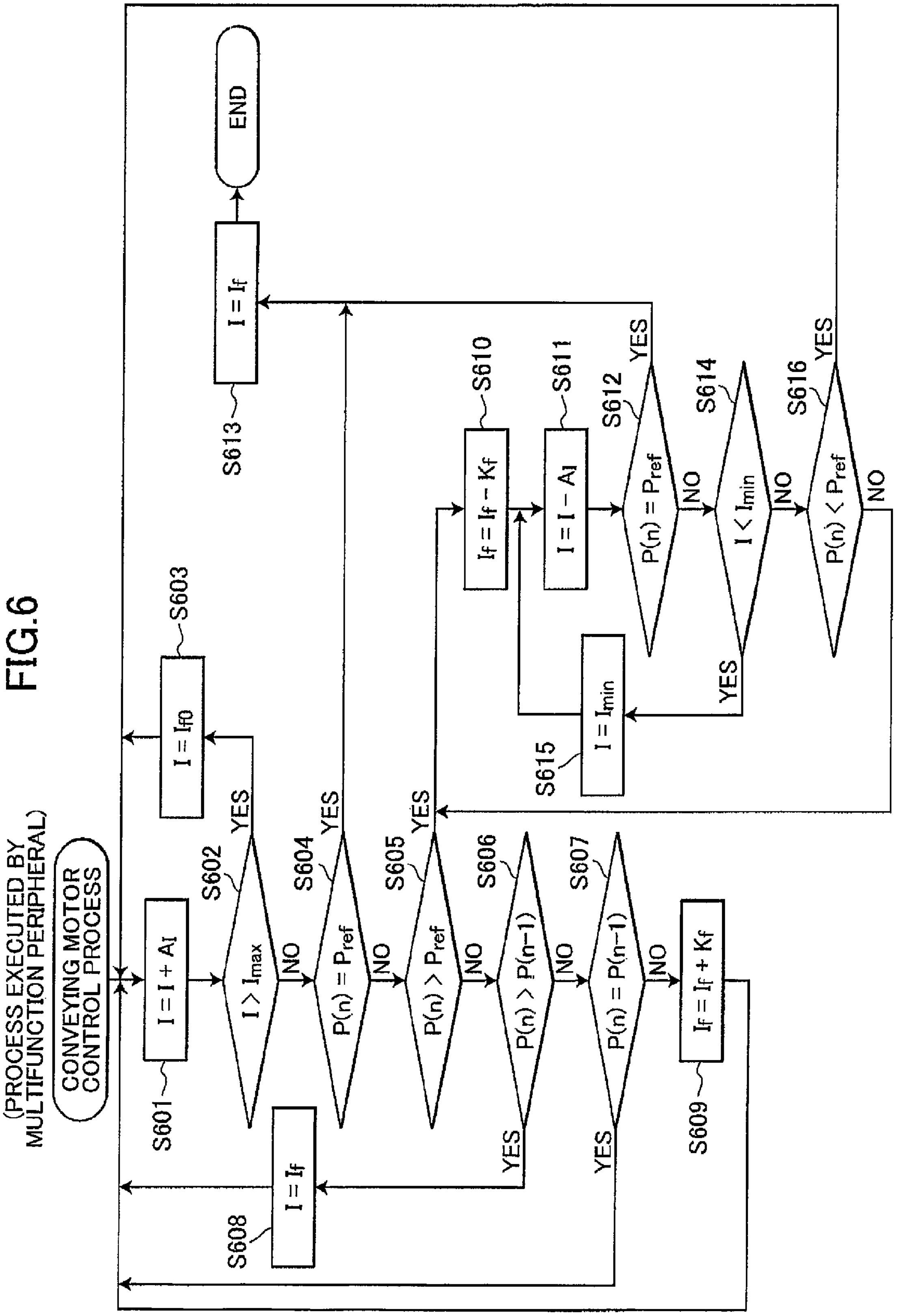
FIG. 6 is a flowchart illustrating steps in a conveying motor control process according to the first embodiment.

Next, the process executed on the multifunction peripheral 1 for controlling the conveying motor will be described with reference to FIG. 6. The conveying motor control process serves to convey the recording medium in small increments. At the beginning of the process in S601 of FIG. 6, the CPU 61 increments the current value I outputted at the previous sampling time by the fixed current incrementing amount $A_I$, setting the value of the current to be outputted to the conveying motor 79. In S602 the CPU 61 determines whether the current value I set in S601 is greater than a predetermined maximum current value $I_{max}$ for preventing the output of an excess current in the plus direction (i.e., the current is too large). If the current value I is greater than the maximum current value $I_{max}$ (S602: YES), then in S603 the CPU 61 sets the current value I to the initial holding current value $I_{f0}$ and repeats the process in S601.

However, if the current value I is less than or equal to the maximum current value $I_{max}$ (S602: NO), then in S604 the CPU 61 determines whether the position P(n) of the recording medium at time n matches the reference position $P_{ref}$. If the position P(n) matches the reference position $P_{ref}$ (S604: YES), then in S613 the CPU 61 sets the current value I to a holding current value $I_f$ which is currently set, and ends the process.

However, if the position P(n) of the recording medium does not match the reference position $P_{ref}$ (S604: NO), then in S605 the CPU 61 determines whether the position P(n) of the recording medium has passed the reference position $P_{ref}$. If the position P(n) is beyond the reference position $P_{ref}$ (S605: YES), then the CPU 61 advances to the process in S610 described later. In other words, the CPU 61 proceeds to the process in S610 described later upon determining that the recording medium has overshot the reference position.

However, if the position P(n) of the recording medium has not passed the reference position $P_{ref}$ (S605: NO), then in S606 the CPU 61 determines whether the position P(n) of the recording medium exceeds a position P(n−1) of the recording medium at the previous sampling time. If the position P(n) of the recording medium has exceeded the position P(n−1) of the recording medium at the previous sampling time (S606: YES), then in S608 the CPU 61 sets the current value I to the holding current value $I_f$. Note that the holding current value $I_f$ that is initially set is the initial holding current value $I_{f0}$. Hence, the initial holding current value $I_{f0}$ is outputted to the conveying motor 79 when the recording medium has been conveyed in the conveying direction toward the reference position $P_{ref}$.

However, if the position P(n) of the recording medium has not exceeded the position P(n−1) of the recording medium at the previous sampling time (S606: NO), then in S607 the CPU 61 determines whether the position P(n) of the recording medium matches the position P(n−1) of the recording medium at the previous sampling time. If the position P(n) of the recording medium matches the position P(n−1) of the recording medium at the previous sampling time (S607: YES), then a current at the current value I which has been set in S601 is outputted to the conveying motor 79.

Specifically, the recording medium is not conveyed in the conveying direction and the rotary encoder 74 does not output a pulse signal indicating that the recording medium has been conveyed in the conveying direction, by a current at the current value I outputted to the conveying motor 79 at the previous sampling time. Accordingly, in S601 the CPU 61 increments the current value I outputted to the conveying motor 79 at the previous sampling time by the fixed current incrementing amount $A_I$.

However, if the position P(n) of the recording medium does not match the position P(n−1) of the recording medium at the previous sampling time (S607: NO), then the recording medium has been conveyed in the direction opposite the conveying direction. Therefore, in S609 the CPU 61 increments the holding current value $I_f$ at the previous sampling time by the holding current value correction amount $K_f$.

In this way, when the CPU 61 determines that the recording medium has been conveyed in the direction opposite the conveying direction (S607: NO), then back tension acting on the recording medium is greater than the force generated by the current at the holding current value $I_f$, causing the recording medium to be conveyed in the opposite direction from the conveying direction. Hence, in S609 the CPU 61 increases the holding current value $I_f$ by the holding current value correction amount $K_f$. Hence, by adjusting the holding current value $I_f$ when the back tension is greater than the force generated by the current at the initial holding current value $I_{f0}$, it is possible to convey the recording medium to the reference position with great accuracy.

However, if the CPU 61 determines in S605 that the position P(n) of the recording medium has exceeded the reference position $P_{ref}$, in other words, that the recording medium has overshot the reference position (S605: YES), then in S610 the CPU 61 decrements the holding current value $I_f$ by the holding current value correction amount $K_f$ and in S611 decrements the current value I outputted at the previous sampling time by the fixed current incrementing amount $A_I$.

In S612 the CPU 61 determines whether the position P(n) of the recording medium at time n matches the reference position $P_{ref}$. If so (S612: YES), then in S613 the CPU 61 sets the current value I to the holding current value $I_f$ and ends the process.

However, if the position P(n) of the recording medium does not match the reference position $P_{ref}$ (S612: NO), then in S614 the CPU 61 determines whether the current value I set in S611 is less than a predetermined minimum current value $I_{min}$ for preventing an excessive current in the minus direction (i.e., the current is too small) from being outputted. If so (S614: YES), then in S615 the CPU 61 sets the current value I to the minimum current value $I_{min}$ and repeats the process from S611.

If the current value I is not less than the minimum current value $I_{min}$ (S614: NO), then in S616 the CPU 61 determines whether the position P(n) of the recording medium has passed the reference position $P_{ref}$. If the position P(n) has not passed the reference position $P_{ref}$ in the direction opposite the conveying direction (S616: NO), in other words, the position P(n) is still larger than the reference position $P_{ref}$, then the CPU 61 repeats the process from S610.

In this way, if the recording medium overshoots the reference position because the back tension is less than the force produced by the current at the holding current value $I_f$, then the CPU 61 sets the holding current value $I_f$ which is less than the holding current value $I_f$ at the previous sampling time by the holding current value correction amount $K_f$. Accordingly, the recording medium can be conveyed to the reference position with accuracy, even when the back tension is less than the force generated by the current at the initial holding current value $I_{f0}$.

However, if the position P(n) of the recording medium has passed the reference position $P_{ref}$ in the direction opposite the conveying direction (S616: YES), then the CPU 61 repeats the process from S601. By repeating the process in S601 in this way, it is possible to convey the recording medium to the reference position with accuracy, even when the recording medium has been conveyed again past the reference position to a previous position (i.e., even when the recording medium has returned and crossed the reference position $P_{ref}$ in the direction opposite the conveying direction).

Next, comparative examples for comparison with the first embodiment will be described with reference to FIGS. 7A and 7B. The upper graphs in FIGS. 7A and 7B show the position P of the recording medium at time n, while the lower graphs show a current value I of the electric current outputted to the DC motor at time n.

Figure 7A:
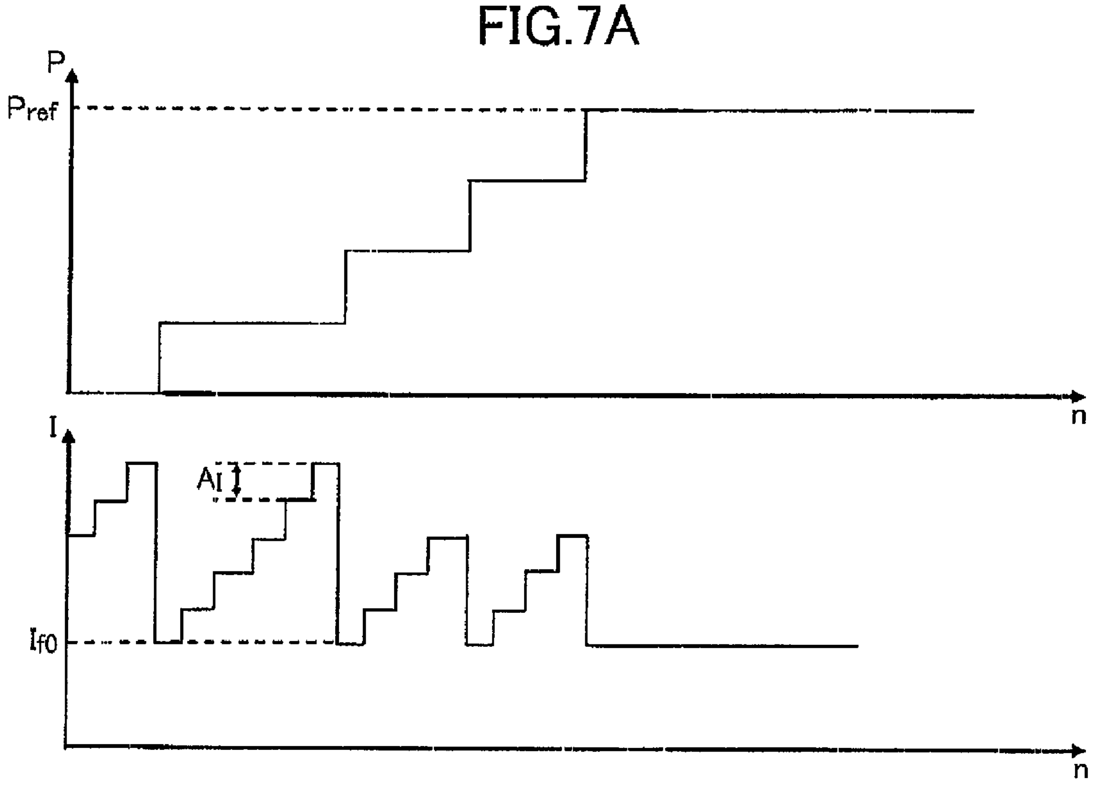
FIG. 7A is an explanatory diagram including an upper graph showing a position P of a recording medium at time n according to a comparative example of the first embodiment, and a lower graph showing a current value I outputted to a conveying motor at time n.
Figure 7B:
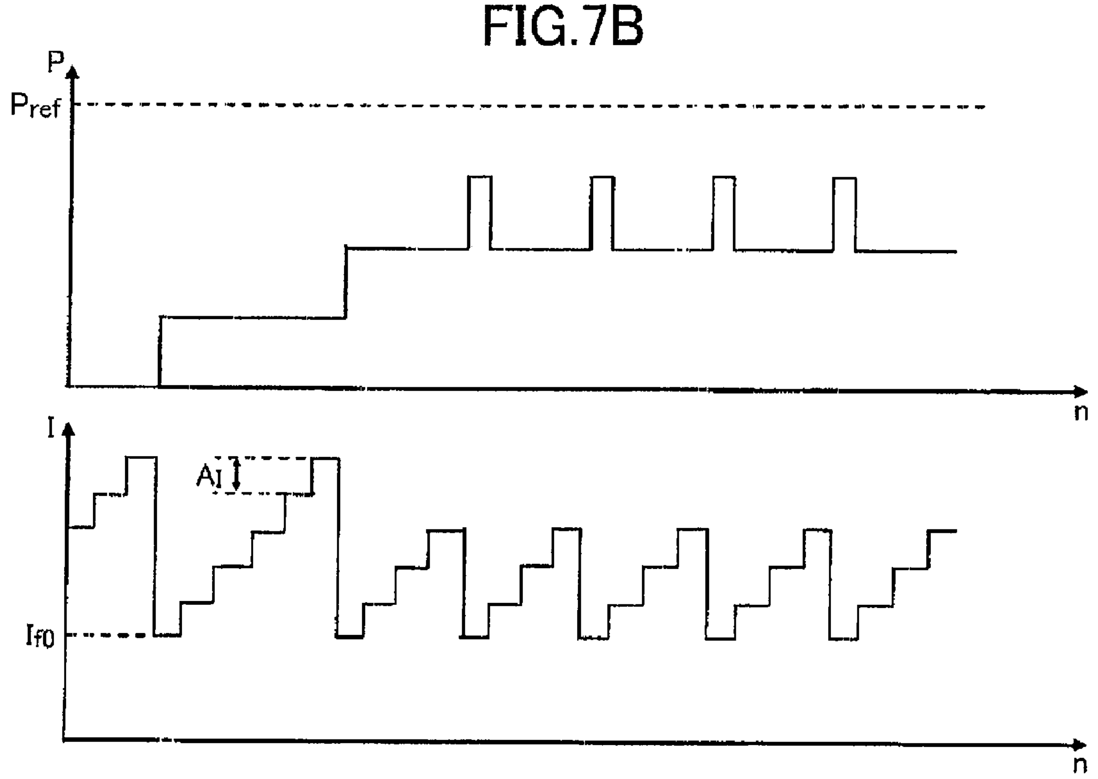
FIG. 7B is an explanatory diagram including an upper graph showing a position P of a recording medium at time n according to another comparative example of the first embodiment, and a lower graph showing a current value I outputted to a conveying motor at time n.

As shown in FIG. 7A, the recording medium is conveyed in small increments to the reference position $P_{ref}$ in the conveying direction by repeatedly incrementing the current of the initial holding current value $I_{f0}$ by the fixed current incrementing amount $A_I$ each time the DC motor rotates and the photosensor outputs a single pulse signal, and outputting this current to the DC motor. In the method described above, if the initial holding current value $I_{f0}$ is preset to generate a force of equal magnitude to the back tension, the recording medium can be conveyed to the reference position $P_{ref}$.

However, the magnitude of the back tension described above varies according to the type of recording medium (normal paper, glossary paper, or thick paper), individual characteristics of the DC motor, and the like. In other words, the magnitude of the back tension is not always constant. FIG. 7B shows an example in which the back tension is greater than a force produced by the initial holding current value $I_{f0}$. In this example, it is not possible to convey the recording medium to the reference position $P_{ref}$ since the back tension is greater than the force produced by the current at the initial holding current value $I_{f0}$, as shown in FIG. 7B. However, such problem does not occur according to the control method in the first embodiment described above.

Next, a controller for a DC motor according to a second embodiment of the invention will be described with reference to FIGS. 8 and 9. Since the mechanical and electrical structure of the controller for a DC motor is identical to that of the first embodiment shown in FIGS. 1 through 3, only the control method of the controller for a DC motor will be described.

The control method according to the second embodiment will be described with reference to FIG. 8.

Figure 8:
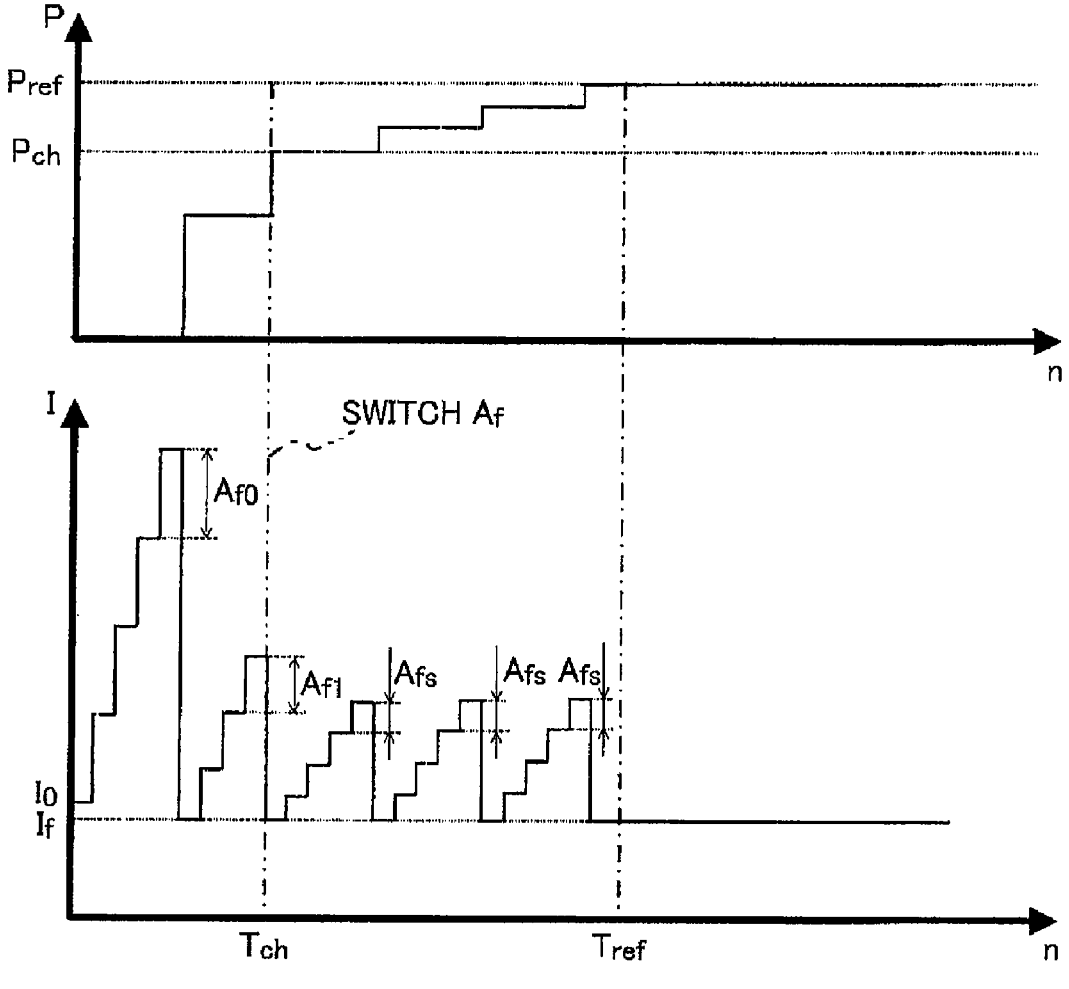
FIG. 8 is an explanatory diagram including an upper graph showing a position P of a recording medium at time n according to a second embodiment, and a lower graph showing a current value I outputted to a conveying motor at time n.
Figure 9:
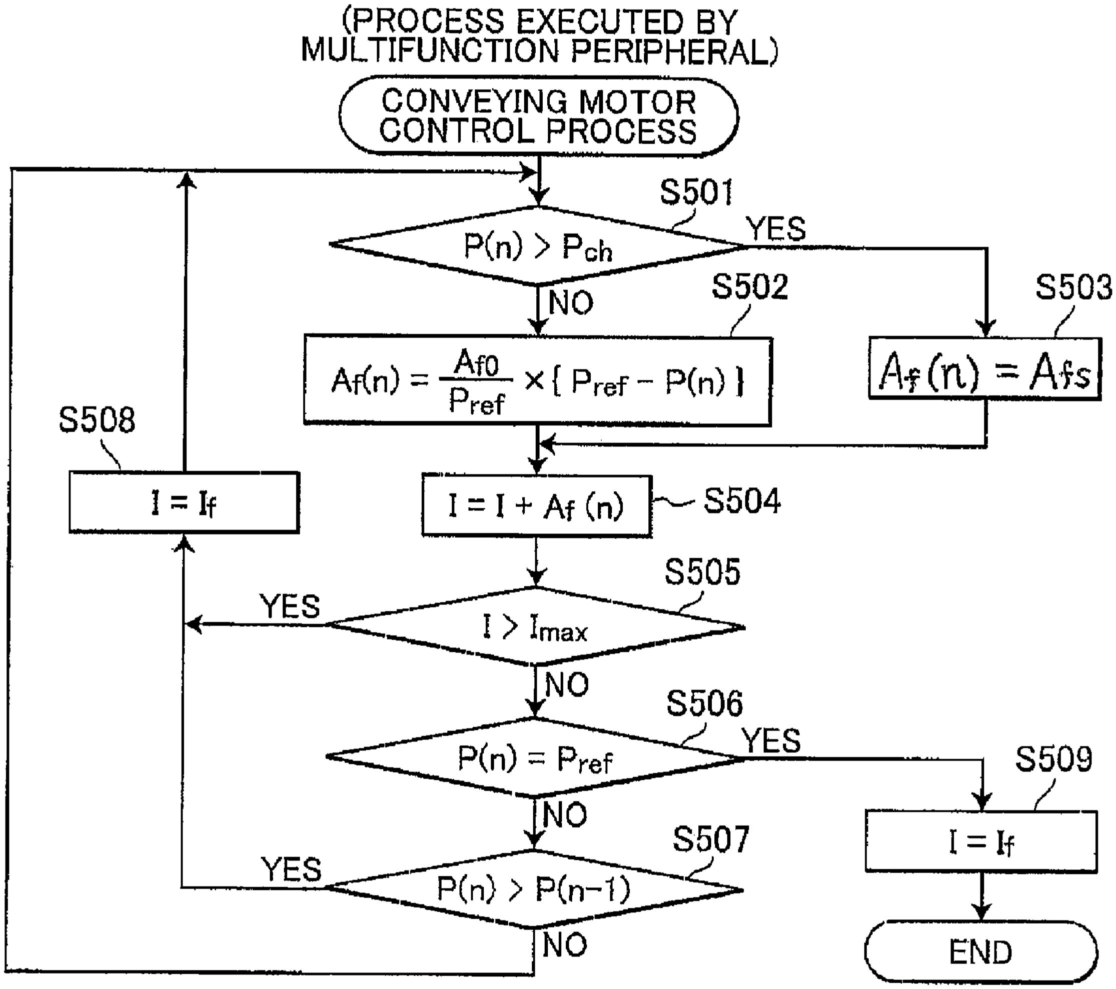
FIG. 9 is a flowchart illustrating steps in a conveying motor control process according to the second embodiment.

As shown in FIG. 8, an electric current at the initial current value $I_0$ is initially outputted to the conveying motor 79 when conveying the recording medium in fine increments. As in the first embodiment described above, the initial current value $I_0$ is set to a value that enables the conveying motor 79 to easily start conveying the recording medium against the static frictional force acting thereon. The current outputted to the conveying motor 79 is subsequently increased from the initial current value $I_0$ by an initial current incrementing amount $A_{f0}$ at predetermined sampling intervals. The initial current incrementing amount $A_{f0}$ is a predetermined value.

Hence, as the recording medium is conveyed in the conveying direction toward the reference position $P_{ref}$, as described in the first embodiment, the conveying motor rotates and a single pulse signal is outputted from the photosensor. When this pulse signal is outputted, an electric current at the holding current value $I_f$ is outputted to the conveying motor 79. Subsequently, the electric current outputted to the conveying motor 79 is incremented from the holding current value $I_f$ by a current incrementing amount $A_{f1}$ to convey the recording medium to a predetermined intermediate position $P_{ch}$ which is located between the conveying start position and the reference position $P_{ref}$. As shown in FIG. 8, the recording medium reaches the intermediate position $P_{ch}$ at an intermediate time $T_{ch}$.

Here, a current incrementing amount $A_{f(n)}$ used from the conveying start position to the intermediate position $P_{ch}$ is set to decreasing values as the recording medium approaches the reference position $P_{ref}$ ($A_{f0}>A_{f1}$). In the present embodiment, the current incrementing amount $A_{f(n)}$ at a sampling time n is calculated according to the $A_{f(n)}=A_{f0}/P_{ref}\times\{P_{ref}-P(n)\}$.

In other words, the current incrementing amount $A_{f(n)}$ is calculated by multiplying the positional difference between the reference position $P_{ref}$ for the recording medium and the current position P(n) of the recording medium ($P_{ref}$-P(n)) by a constant ($A_{f0}/P_{ref}$). Hence, the current incrementing amount $A_{f(n)}$ can be set based on the current position of the recording medium.

In this way, by setting the current incrementing amount $A_{f(n)}$ for a section from the conveying start position to the intermediate position $P_{ch}$, the time elapsed before the recording medium begins to move in the conveying direction increases as the recording medium approaches the intermediate position $P_{ch}$ (reference position $P_{ref}$) However, the distance for conveying the recording medium one time becomes smaller, making it possible to convey the recording medium with great accuracy to the intermediate position $P_{ch}$.

After conveying the recording medium to the intermediate position $P_{ch}$, the recording medium is conveyed to the reference position $P_{ref}$ by repeatedly increasing the current outputted to the conveying motor 79 from the holding current value $I_f$ by a current incrementing amount $A_{fs}$ (predetermined constant value in the present embodiment) each time the recording medium is conveyed in the conveying direction. This method can convey the recording medium to the reference position $P_{ref}$ more rapidly than the comparative examples described later.

Next, a process executed by the multifunction peripheral 1 according to the second embodiment for controlling the conveying motor will be described with reference to the flowchart in FIG. 9.

At the beginning of the conveying motor control process in S501, the CPU 61 determines whether the recording medium has been conveyed to a position P(n) past the intermediate position $P_{ch}$. If the position P(n) of the recording medium is not past the intermediate position $P_{ch}$ (S501: NO), then in S502 the CPU 61 sets the current incrementing amount $A_{f(n)}$ to a value obtained from the equation $A_{f(n)}=A_{f0}/P_{ref}\times\{P_{ref}-P(n)\}$. However, if the position P(n) of the recording medium is past the intermediate position $P_{ch}$ (S501: YES), then in S503 the CPU 61 sets the current incrementing amount $A_{f(n)}$ to the constant value $A_{fs}$.

In S504 the CPU 61 increments the previously outputted current value I by the current incrementing amount $A_{f(n)}$ set in either S502 or S503. In S505 the CPU 61 determines whether the current value I set in S504 is greater than a maximum current value $I_{max}$. If the current value I is not greater than the maximum current value $I_{max}$ (S505: NO), then the current of the current value I set in S504 is outputted to the conveying motor 79. However, if the current value I is greater than the maximum current value $I_{max}$ (S505: YES), then in S508 the CPU 61 resets the current value I to the holding current value $I_f$ and repeats the process in S501. Here, the maximum current value $I_{max}$ is predetermined to prevent output of an excessive current in the plus direction.

In S506 the CPU 61 determines whether the position P(n) of the recording medium matches the reference position $P_{ref}$ as a result of outputting a current at the current value I. If the position P(n) matches the reference position $P_{ref}$ (S506: YES), indicating that the recording medium has arrived at the reference position $P_{ref}$, in S509 the CPU 61 sets the current value I to the preset holding current value $I_f$ and ends the process.

However, if the position P(n) of the recording medium does not match the reference position $P_{ref}$ (S506: NO), then in S507 the CPU 61 determines whether the position P(n) of the recording medium exceeds a position P(n−1) of the recording medium at the previous sampling time. If so (S507: YES), in S508 the CPU 61 sets the current value I to the holding current value $I_f$ so that the current at the preset holding current value $I_f$ will be outputted to the conveying motor 79. Hence, a current at the holding current value $I_f$ is outputted to the conveying motor 79 when conveying the recording medium in the conveying direction toward the reference position $P_{ref}$.

However, if the position P(n) of the recording medium does not exceed the position P(n−1) of the recording medium at the previous sampling time (S507: NO), then the CPU 61 repeats the process from S501. In other words, since the recording medium is not conveyed in the conveying direction and the rotary encoder 74 has not outputted a pulse signal indicating the recording medium has been conveyed in the conveying direction, the CPU 61 again repeats the process from S501.

In the conveying motor control process according to the second embodiment described above, the CPU 61 determines in S501 whether the recording medium has passed the intermediate position $P_{ch}$. While the recording medium has not passed the intermediate position $P_{ch}$ (S501: NO), the CPU 61 sets the current incrementing amount $A_{f(n)}$ gradually less as the recording medium approaches the reference position $P_{ref}$ (intermediate position $P_{ch}$), according to the process in S502. However, when the recording medium has passed the intermediate position $P_{ch}$ (S501: YES), then the CPU 61 sets the current incrementing amount $A_{f(n)}$ to a constant value of predetermined magnitude, according to the process in S503. Hence, the controller for a DC motor according to the second embodiment can convey the recording medium more quickly and reliably to the reference position than when simply setting the current incrementing amount $A_{f(n)}$ to decreasing values as the recording medium approaches the reference position $P_{ref}$ over the entire range from the conveying start position to the reference position.

Next, comparative example related to the second embodiment will be described with reference to FIGS. 10A through 10C. The upper graph in FIG. 10A shows the position P of the recording medium at time n, while the lower graph shows the current value I outputted to the DC motor at time n.

Figure 10A:
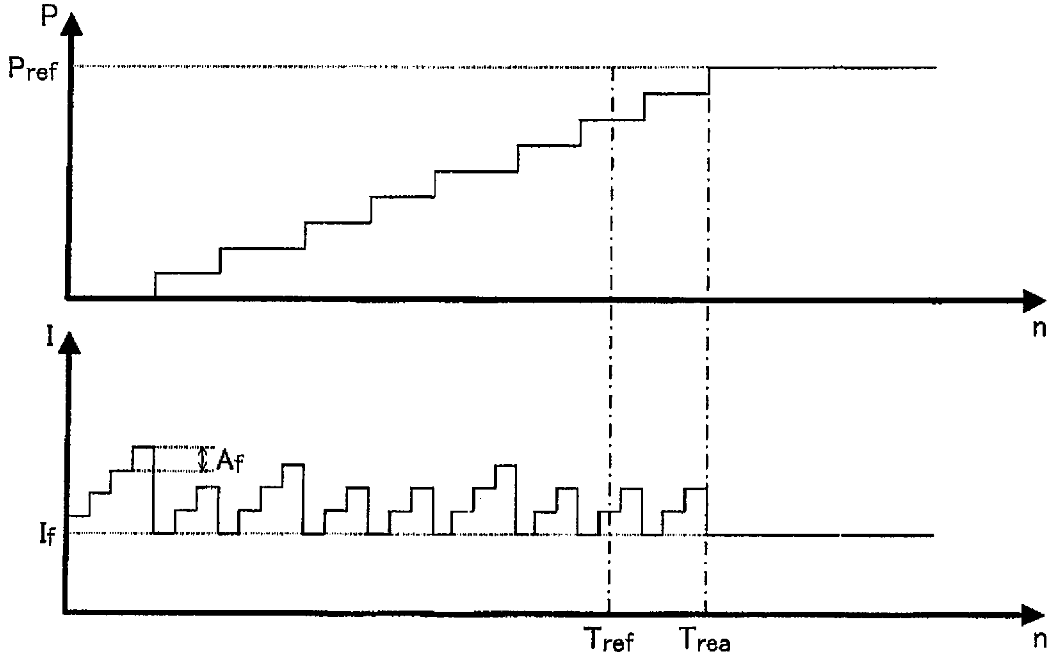
FIG. 10A is an explanatory diagram illustrating a method of controlling conveyance of a recording medium according to a comparative example of the second embodiment.

As shown in FIG. 10A, the recording medium is conveyed in small increments to the reference position $P_{ref}$ in the conveying direction by repeatedly performing a process to increment the current outputted to the DC motor from the predetermined holding current value $I_f$ by a fixed current incrementing amount $A_f$ each time the DC motor rotates and the photosensor outputs a single pulse signal.

However, in the example shown in FIG. 10A, the time $T_{rea}$ required to convey the recording medium to the reference position $P_{ref}$ exceeds a target arrival time $T_{ref}$. It is conceivable that the current incrementing amount $A_f$ for the current outputted to the DC motor could be increased from the value set in FIG. 10A.

Figure 10B:
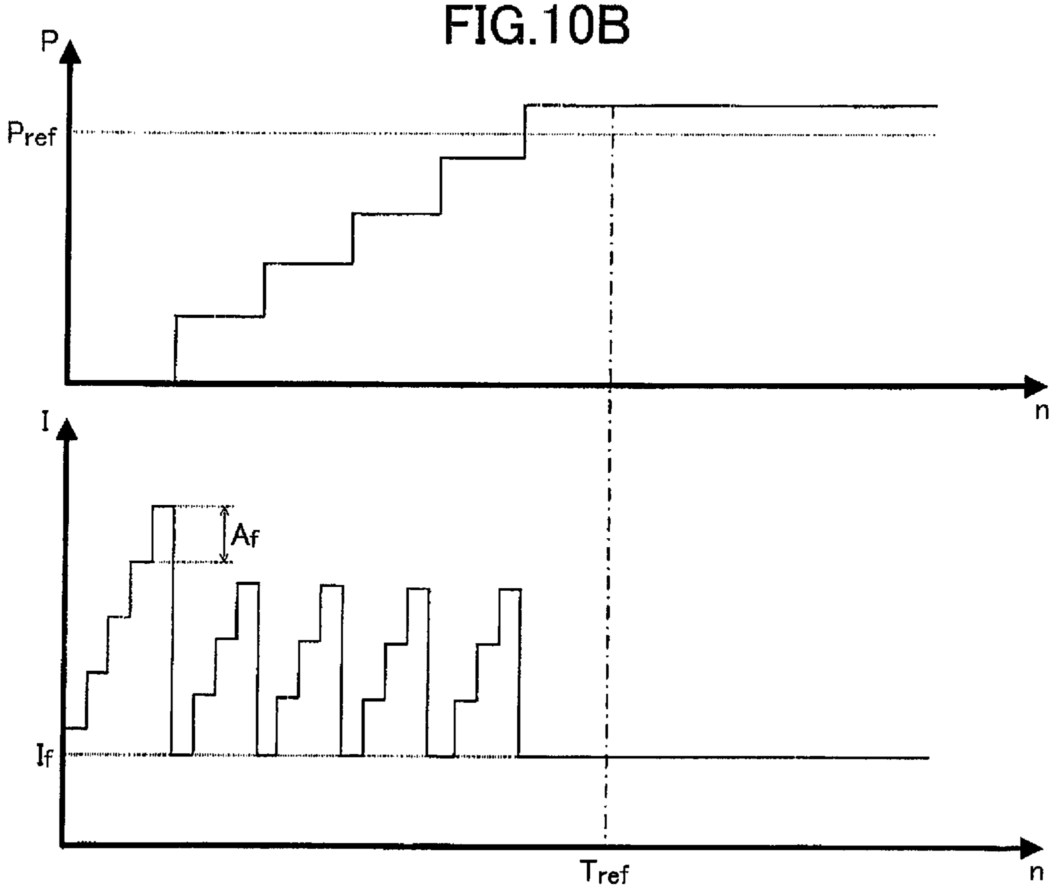
FIG. 10B is an explanatory diagram illustrating a method of controlling conveyance of a recording medium according to another comparative example of the second embodiment.

The example in FIG. 10B shows a case in which the current incrementing amount $A_f$ of the current outputted to the DC motor is set larger than that in FIG. 10A. As shown in FIG. 10B, the recording medium can be conveyed to the reference position $P_{ref}$ by the target arrival time $T_{ref}$, but the recording medium overshoots the reference position $P_{ref}$.

Figure 10C:
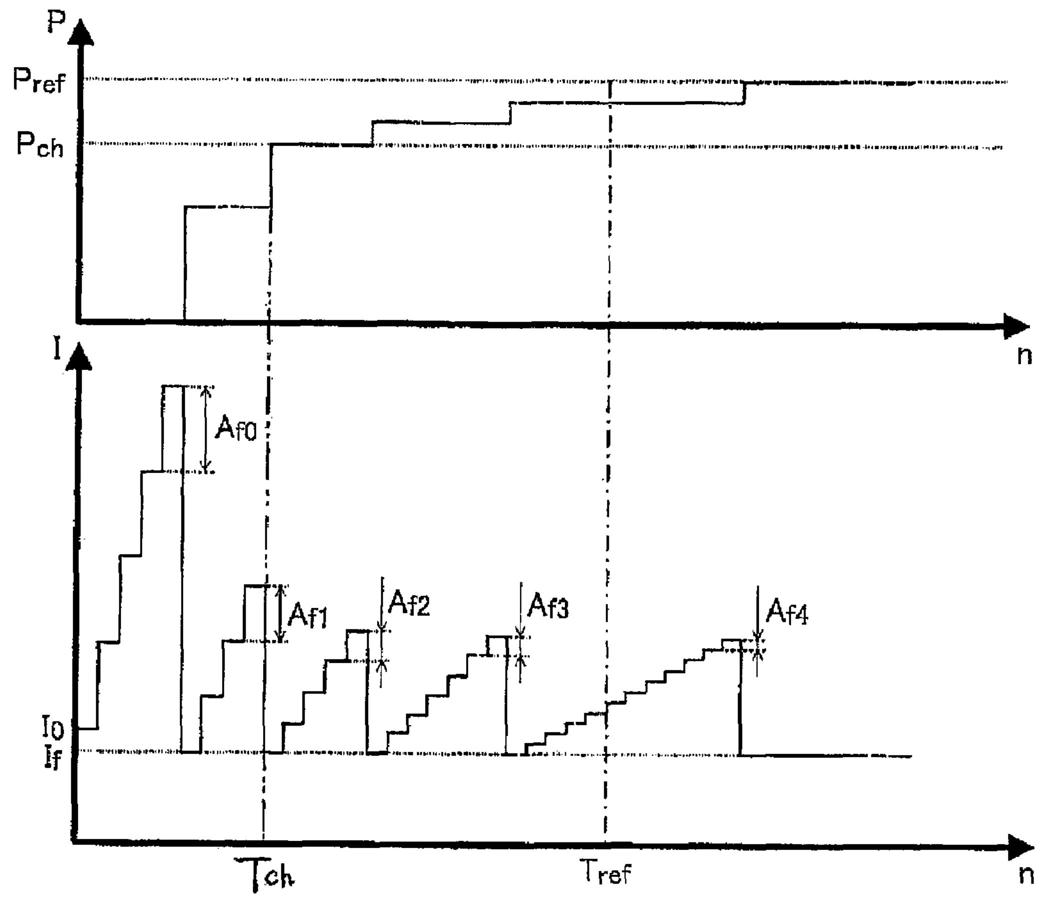
FIG. 10C is an explanatory diagram illustrating a method of controlling conveyance of a recording medium according to still another comparative example of the second embodiment.

Therefore, the example shown in FIG. 10C sets the current incrementing amount $A_f$ for the current outputted to the DC motor initially larger than the value set in FIG. 10A. However, the current incrementing amount $A_f$ is decreased in steps as the recording medium approaches the reference position. In this way, the recording medium can be conveyed to the reference position without overshooting the position.

The upper graph in FIG. 10C shows the position P of the recording medium at time n, while the lower graph shows the current value I of the current outputted to the conveying motor 79 at time n. As in the example of the second embodiment shown in FIG. 8, the current incrementing amount $A_{f(n)}$ shown in FIG. 10C is calculated for the sampling time n according to the equation $A_{f(n)}=A_{f0}/P_{ref}\times\{P_{ref}-P(n)\}$.

The control method for the example shown in FIG. 10C differs from the method shown in FIG. 8 in that the current incrementing amount $A_{f(n)}$ is set to gradually decreasing values as the recording medium approaches the reference position $P_{ref}$, even when the recording medium reaches the intermediate position $P_{ch}$.

By comparing FIGS. 8 and 10C, it is clear that the control method according to the second embodiment shown in FIG. 8 can reach the reference position $P_{ref}$ by the target arrival time $T_{ref}$, while the control method according to the comparative example shown in FIG. 10C cannot reach the reference position $P_{ref}$ by the target arrival time $T_{ref}$.

Hence, the control method according to the second embodiment can convey the recording medium to the reference position $P_{ref}$ in a shorter time than the control method shown in FIG. 10C. Specifically, the current incrementing amount $A_{fs}$ shown in FIG. 8 is set to a larger value than a current incrementing amount $A_{f2}$ shown in FIG. 10C set after the recording medium reaches the intermediate position $P_{ch}$. Accordingly, the method of the second embodiment can convey the recording medium to the reference position $P_{ref}$ quicker than the control method shown in FIG. 10C.

Specifically, the control method according to the second embodiment conveys the recording medium accurately to the intermediate position $P_{ch}$ by setting the current incrementing amount $A_{f(n)}$ linearly based on the position of the recording medium from the conveying start position to the intermediate position $P_{ch}$. However, since the intermediate position $P_{ch}$ is preset to a position at which the recording medium can be conveyed accurately to the reference position $P_{ref}$ by outputting a predetermined current, the method of the second embodiment can convey the recording medium quickly and accurately to the reference position $P_{ref}$.

Since the current incrementing amount $A_{fs}$ is set to a constant, the method of the second embodiment reduces the processing load required to set the current incrementing amount $A_{f(n)}$ in the range from the intermediate position $P_{ch}$ to the reference position $P_{ref}$. It is also preferable to set the current incrementing amount $A_{fs}$ to the largest value within the range in which the recording medium will not overshoot the reference position $P_{ref}$. By setting the current incrementing amount $A_{fs}$ in this way, it is possible to convey the recording medium more quickly to the reference position $P_{ref}$.

While the invention has been described in detail with reference to the above aspects thereof, it would be apparent to those skilled in the art that various changes and modifications may be made therein without departing from the spirit of the invention.

For example, when conveying the recording medium from the conveying start position to the reference position, the conveying motor 79 may be first accelerated, then maintained at a fixed speed, and then decelerated to a constant speed. The control process in the first embodiment may be executed between a predetermined position after the conveying motor 79 has been decelerated to the constant speed and the reference position.

The second embodiment describes a case of outputting the holding current value If which is a constant value, as the current value that is initially outputted when conveying the recording medium. However, this holding current value $I_f$ may be configured as a variable value rather than a constant.

In the second embodiment, the current incrementing amount $A_{fs}$ is defined as a predetermined constant value. In FIG. 8, the same value of the current incrementing amount $A_{fs}$ is used for incrementing the current I when the recording medium is positioned between the intermediate position $P_{ch}$ and the reference position $P_{ref}$. However, the current incrementing amount $A_{fs}$ may be a variable. More specifically, the current incrementing amount $A_{fs}$ may be a value greater than an imaginary incrementing amount which is an amount that is finally set assuming that the current incrementing amount $A_{f(n)}$ is continually reduced when the recording medium is positioned between the intermediate position $P_{ch}$ and the reference position $P_{ref}$. Note that the imaginary incrementing amount corresponds to the current incrementing amount $A_{f4}$ in FIG. 10C.

What is claimed is:

1. A controller for a DC motor, comprising:

a processor; and a memory, the memory having a data structure stored thereon for execution by the processor, the data structure comprising:

a first determining section that determines whether a recording medium is conveyed in a first direction, based on a signal outputted from a detector that detects rotation of a DC motor, the first direction being a direction toward a reference position;

a setting section that sets a first current value as a current initially outputted to the DC motor each time the first determining section determines that the recording medium is conveyed in the first direction;

a first current outputting section that outputs to the DC motor a current at the first current value set by the setting section, and that subsequently outputs by steps a current gradually higher than the first current value to the DC motor until the first determining section again determines that the recording medium is conveyed in the first direction;

a second determining section that determines whether the recording medium is conveyed in a second direction opposite the first direction after the first current outputting section outputs a current at the first current value to the DC motor; and a first updating section that updates the first current value set by the setting section to a second current value higher than the first current value, when the second determining section determines that the recording medium is conveyed in the second direction.

2. The controller for a DC motor according to claim 1, the data structure further comprising:

a third determining section that determines whether the recording medium is conveyed beyond the reference position after the first current outputting section outputs a current at the first current value to the DC motor;

a second updating section that updates the first current value set by the setting section to a third current value lower than first current value, when the third determining section determines that the recording medium is conveyed beyond the reference position; and a second current outputting section that outputs in steps, to the DC motor, a current at a current value gradually lower than the first current value toward the third current value updated by the second updating section.

3. The controller for a DC motor according to claim 2, the data structure further comprising:

a fourth determining section that determines whether the recording medium passes the reference position in the second direction, after the second current outputting section outputs a current to the DC motor; and a third current outputting section that outputs a current higher than a current outputted by the second current outputting section to the DC motor, when the fourth determining section determines that the recording medium passes the reference position in the second direction.

4. A controller for a DC motor, comprising:

a processor; and a memory, the memory having a data structure stored thereon for execution by the processor, the data structure comprising:

a first determining section that determines whether a recording medium is conveyed in a first direction, based on a signal outputted from a detector that detects rotation of a DC motor, the first direction being a direction toward a reference position;

a setting section that sets a first current value as a current initially outputted to the DC motor each time the first determining section determines that the recording medium is conveyed in the first direction;

a first current outputting section that outputs to the DC motor a current at the first current value set by the setting section, and that subsequently outputs by steps a current gradually higher than the first current value to the DC motor until the first determining section again determines that the recording medium is conveyed in the first direction;

a third determining section that determines whether the recording medium is conveyed beyond the reference position after the first current outputting section outputs a current at the first current value to the DC motor;

a second updating section that updates the first current value set by the setting section to a third current value lower than first current value, when the third determining section determines that the recording medium is conveyed beyond the reference position; and a second current outputting section that outputs in steps, to the DC motor, a current at a current value gradually lower than the first current value toward the third current value updated by the second updating section.

5. A controller for a DC motor, comprising:

a processor; and a memory, the memory having a data structure stored thereon for execution by the processor, the data structure comprising:

a first determining section that determines whether a recording medium is conveyed in a conveying direction from a predetermined position toward a reference position, based on a signal outputted from a detector that detects rotation of a DC motor;

a current outputting section that outputs to the DC motor a current that is incremented by steps from a predetermined current value during a time period after the first determining section determines that the recording medium is conveyed in the conveying direction and until the first determining section again determines that the recording medium is conveyed in the conveying direction;

a second determining section that determines, based on a signal outputted from the detector, whether the recording medium is conveyed to an intermediate position that is between the predetermined position and the reference position;

a first setting section that sets a first incrementing amount such that the first incrementing amount decreases as the recording medium approaches the reference position when the second determining section determines that the recording medium has not reached the intermediate position, the first incrementing amount being an amount for incrementing a current to be outputted by the current outputting section when the recording medium is positioned between the predetermined position and the intermediate position; and a second setting section that, sets a second incrementing amount to a value greater than an imaginary incrementing amount when the second determining section determines that the recording medium has reached the intermediate position, the second incrementing amount being an amount for incrementing a current to be outputted by the current outputting section when the recording medium is positioned between the intermediate position and the reference position, the imaginary incrementing amount being an amount that is finally set by the first setting section assuming that the first setting section continually reduces the first incrementing amount when the recording medium is positioned between the intermediate position and the reference position.

6. The controller for a DC motor according to claim 5, wherein the second setting section sets the second incrementing amount to a maximum value within a range in which the recording medium does not, pass the reference position.

7. The controller for a DC motor according to claim 5, wherein the second setting section sets the second incrementing amount to a constant value.

8. The controller for a DC motor according to claim 5, wherein the data structure further comprises a storing section that stores a position of the recording medium for each of a plurality of sampling times, and wherein the first setting section calculates the first incrementing amount based on a difference between the position of the recording medium stored in the storing section and the reference position.

9. An inkjet recording device comprising:

a DC motor;

a detector that detects rotation of the DC motor;

a conveying device that is driven by the DC motor for conveying a recording medium;

a recording head that ejects ink on the recording medium conveyed by the conveying device; and a controller that controls the DC motor, the controller comprising:

a processor; and a memory, the memory having a data structure stored thereon for execution by the processor, the data structure comprising:

a first determining section that determines whether the recording medium is conveyed in a first direction based on a signal outputted from the detector, the first direction being a direction toward a reference position;

a setting section that sets a first current value as a current initially outputted to the DC motor each time the first determining section determines that the recording medium is conveyed in the first direction;

a first current outputting section that outputs to the DC motor a current at the first current value set by the setting section, and that subsequently outputs by steps a current gradually higher than the first current value to the DC motor until the first determining section again determines that the recording medium is conveyed in the first direction;

a second determining section that determines whether the recording medium is conveyed in a second direction opposite the first direction after the first current outputting section outputs a current at the first current value to the DC motor; and a first updating section that updates the first current value set by the setting section to a second current value higher than the first current value, when the second determining section determines that the recording medium is conveyed in the second direction.

10. An inkjet recording device comprising:

a DC motor;

a detector that detects rotation of the DC motor;

a conveying device that is driven by the DC motor for conveying a recording medium;

a recording head that ejects ink on the recording medium conveyed by the conveying device; and a controller that controls the DC motor, the controller comprising:

a processor; and a memory, the memory having a data structure stored thereon for execution by the processor, the data structure comprising:

a first determining section that determines whether the recording medium is conveyed in a conveying direction from a predetermined position toward a reference position based on a signal outputted from the detector;

a current outputting section that outputs to the DC motor a current that is incremented by steps from a predetermined current value during a time period after the first determining section determines that the recording medium is conveyed in the conveying direction and until the first determining section again determines that the recording medium is conveyed in the conveying direction;

a second determining section that determines, based on a signal outputted from the detector, whether the recording medium is conveyed to an intermediate position that is between the predetermined position and the reference position;

a first setting section that sets a first incrementing amount such that the first incrementing amount decreases as the recording medium approaches the reference position when the second determining section determines that the recording medium has not reached the intermediate position, the first incrementing amount being an amount for incrementing a current to be outputted by the current outputting section when the recording medium is positioned between the predetermined position and the intermediate position; and a second setting section that sets a second incrementing amount to a value greater than an imaginary incrementing amount when the second determining section determines that the recording medium has reached the intermediate position, the second incrementing amount being an amount for incrementing a current to be outputted by the current outputting section when the recording medium is positioned between the intermediate position and the reference position, the imaginary incrementing amount being an amount that is finally set by the first setting section assuming that the first setting section continually reduces the first incrementing amount when the recording medium is positioned between the intermediate position and the reference position.

* * * * *